(12) United States Patent
Abendroth et al.

(10) Patent No.: US 8,261,076 B2
(45) Date of Patent: Sep. 4, 2012

(54) METHOD AND DEVICE FOR AGREEING SHARED KEY BETWEEN FIRST COMMUNICATION DEVICE AND SECOND COMMUNICATION DEVICE

(75) Inventors: Jörg Abendroth, München (DE); Jorge Cuellar, Baierbrunn (DE); Hariharan Rajasekaran, Bonn (DE)

(73) Assignee: Siemens Aktiengesellschsft, Munich (DE)

( * ) Notice: Subject to any disclaimer, the term of this patent is extended or adjusted under 35 U.S.C. 154(b) by 988 days.

(21) Appl. No.: 12/223,386

(22) PCT Filed: Jan. 26, 2007

(86) PCT No.: PCT/EP2007/050759
§ 371 (c)(1),
(2), (4) Date: Jul. 30, 2008

(87) PCT Pub. No.: WO2007/085642
PCT Pub. Date: Aug. 2, 2007

(65) Prior Publication Data
US 2009/0041251 A1     Feb. 12, 2009

(30) Foreign Application Priority Data
Jan. 30, 2006   (DE) .......................... 10 2006 004 237

(51) Int. Cl.
*H04L 29/02* (2006.01)
*H04L 9/32* (2006.01)

(52) U.S. Cl. ....................................... 713/169; 713/168
(58) Field of Classification Search .................. None
See application file for complete search history.

(56) References Cited

U.S. PATENT DOCUMENTS

| 5,937,066 | A | 8/1999 | Gennaro et al. |
| 6,243,811 | B1 | 6/2001 | Patel |
| 6,336,188 | B2 * | 1/2002 | Blake-Wilson et al. ...... 713/171 |
| 6,401,204 | B1 | 6/2002 | Euchner et al. |
| 6,591,364 | B1 | 7/2003 | Patel |
| 6,842,106 | B2 * | 1/2005 | Hughes et al. .................. 340/5.8 |
| 6,850,620 | B2 | 2/2005 | Menezes et al. |
| 6,918,035 | B1 | 7/2005 | Patel |

(Continued)

FOREIGN PATENT DOCUMENTS

DE         102 12 620 A1    10/2003

(Continued)

OTHER PUBLICATIONS

Menezes et al., "Handbook of Applied Cryptography", CRC Press LLC, 1996, pp. 397-406 pp. 489-524.

(Continued)

*Primary Examiner* — Venkat Perungavoor
(74) *Attorney, Agent, or Firm* — Staas & Halsey LLP

(57) ABSTRACT

Based on security parameters previously agreed upon by first and second communication devices, a first security value is determined by the second communication device and transmitted to the first communication device. The first communication device determines second and third security values based on the security parameters and the first security value and transmits the second and third security values to the second communication device. The second communication device determines a fourth security value based on the security parameters and, if the second security value matches the fourth security value, authenticates the first communication device. Upon successful authentication of the first communication device, a shared key is determined by both communication devices based on the third security value and the security parameters.

7 Claims, 3 Drawing Sheets

U.S. PATENT DOCUMENTS

| | | | |
|---|---|---|---|
| 7,120,797 B2* | 10/2006 | Wheeler | 713/176 |
| 7,370,194 B2 | 5/2008 | Morais et al. | |
| 2001/0016908 A1 | 8/2001 | Blake-Wilson et al. | |
| 2001/0021256 A1 | 9/2001 | Menezes et al. | |
| 2002/0124176 A1* | 9/2002 | Epstein | 713/186 |
| 2003/0177353 A1 | 9/2003 | Hiltgen | |
| 2003/0229779 A1 | 12/2003 | Morais et al. | |
| 2004/0019786 A1 | 1/2004 | Zorn et al. | |
| 2004/0066278 A1* | 4/2004 | Hughes et al. | 340/10.1 |
| 2004/0162870 A1* | 8/2004 | Matsuzaki et al. | 709/200 |
| 2005/0010769 A1 | 1/2005 | You et al. | |
| 2005/0028787 A1 | 2/2005 | Abrams et al. | |
| 2005/0278787 A1 | 12/2005 | Naslund et al. | |
| 2006/0209689 A1* | 9/2006 | Nakano et al. | 370/230 |

FOREIGN PATENT DOCUMENTS

| | | |
|---|---|---|
| EP | 1 513 040 A1 | 3/2005 |
| JP | 10126404 | 5/1998 |
| JP | 11225141 | 8/1999 |
| JP | 2000078669 | 3/2000 |
| JP | 2000083017 | 3/2000 |
| JP | 2000106553 | 4/2000 |
| JP | 2000511382 | 8/2000 |
| JP | 2002514841 | 5/2002 |
| JP | 2002198955 | 7/2002 |
| JP | 2002519939 | 7/2002 |
| JP | 2004056784 | 2/2004 |
| WO | 00/01109 | 1/2000 |

OTHER PUBLICATIONS

"Chipcards with digital signature application/function according to SigG and SigV", Part 4: Basic Security Services, DIN V66291-4, Jun. 7, 2000, pp. 1-71.

"Information Technology—Security Techniques—Key Management—Part 3, Mechanisms using asymmetric techniques", ISO/IEC 11770-3, Nov. 1999, pp. i-iii, 1-35.

Laurie et al., "An Efficient Protocol for Authenticated Key Agreement", Technical Report CORR 98-05, Dept. of C&O, University of Waterloo, Canada, Aug. 1998, pp. 16.

W. Rankl et al., "Handbuch der Chipkarten, Aufbau—Funktionsweise—Einsatz von Smart Cards", vol. 4, Hanser Verlag, 2002, pp. 465-475.

Standards for Efficient Cryptography, SEC1: Elliptic Curve Cryptography, Certicom Corporation, 2000, pp. i-v, 1-90.

Taekyoung Kwon, "Authentication and Key Agreement via Memorable Password", Proceedings of Internet Society Network and Distributed System Security Symposium (NDSS) 2001, 13 pp.

Boyeon Song et al., "Comparison of Existing Key Establishment Protocols", KIISC (CISC 2000), vol. 10, No. 1, Nov. 2000, pp. 677-690.

L. Law et al.; "An Efficient Protocol for Authenticated Key Agreement"; Technical Report CORR 98-05, Dept of C&O, University of Waterloo, Canada, Mar. 1998, Revised 28, Aug. 1988, pp. i, ii, 1-16.

DE 102 12 620 published Sep. 10, 2003 (Ref. AH) corresponds to U.S. Patent Publication No. US2003/177353 A1 published Sep. 18, 2003 (Ref. AA).

International Search Report for Application No. PCT/EP2007/050759; mailed Jun. 27, 2007.

Masashi Ito: "Als Protokoll gesehene IPsec and SSL. Die codierte Datenübertragung wird hier verwirklicht", Network Magazine, ASCII Corporation, Jan. 4, 2004, vol. 9, No. 4, pp. 156-159; Magazine. (Japanese language 5 pages) (Partial German translation 3 pages) (Partial English translation, 3 pages).

German language of Japanese Office Action received Jul. 11, 2011 in related Japanese Application No. 2008-552784 (8 pages).

EP Opposition Search Report of Apr. 21, 2010 in related EP No. 1 980 080 (1 page of citations D1-D14).

\* cited by examiner

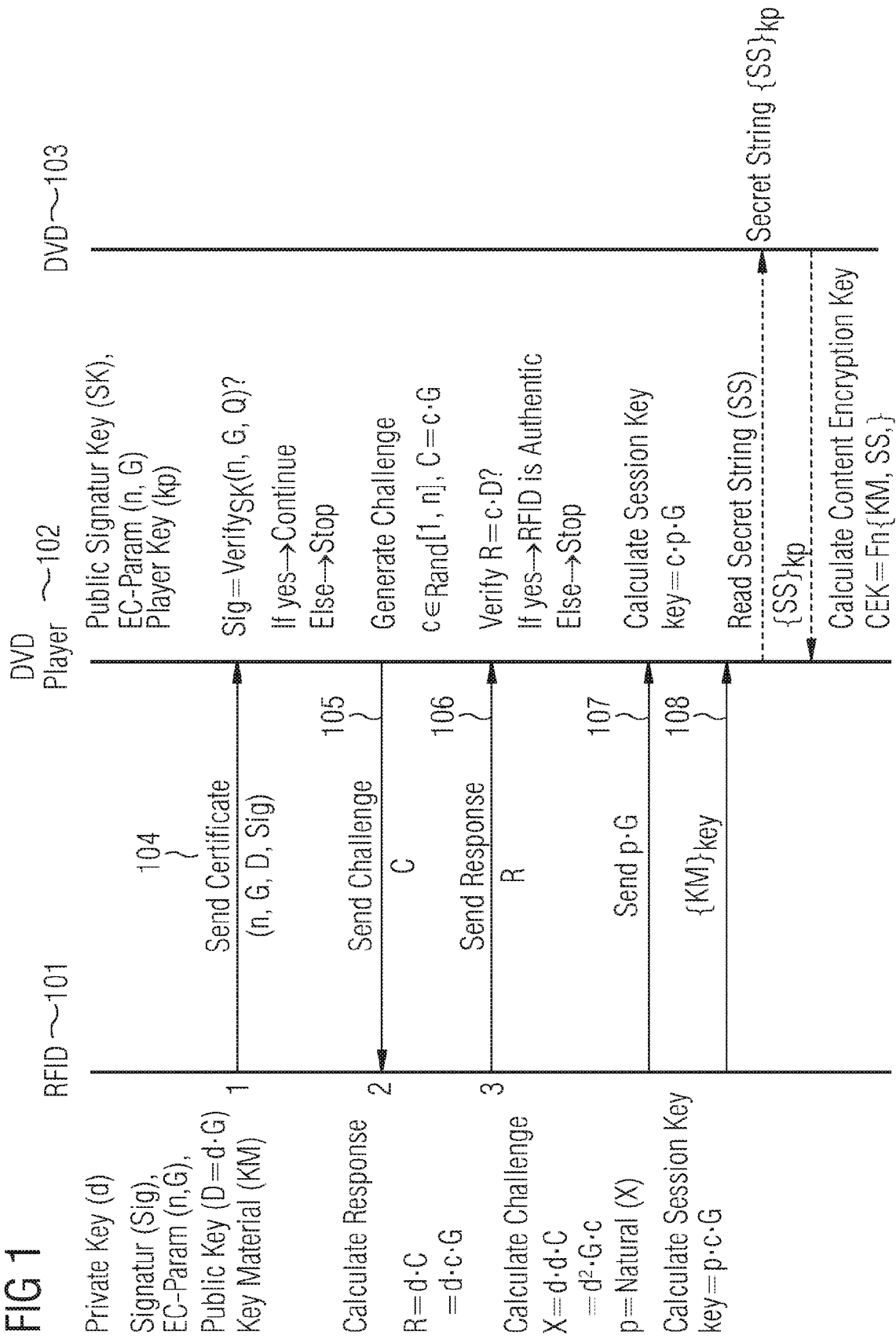

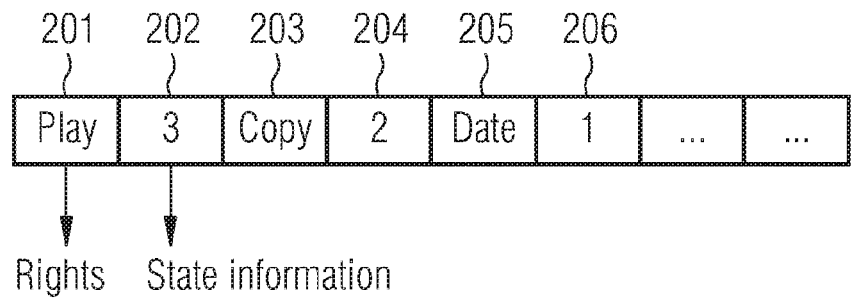
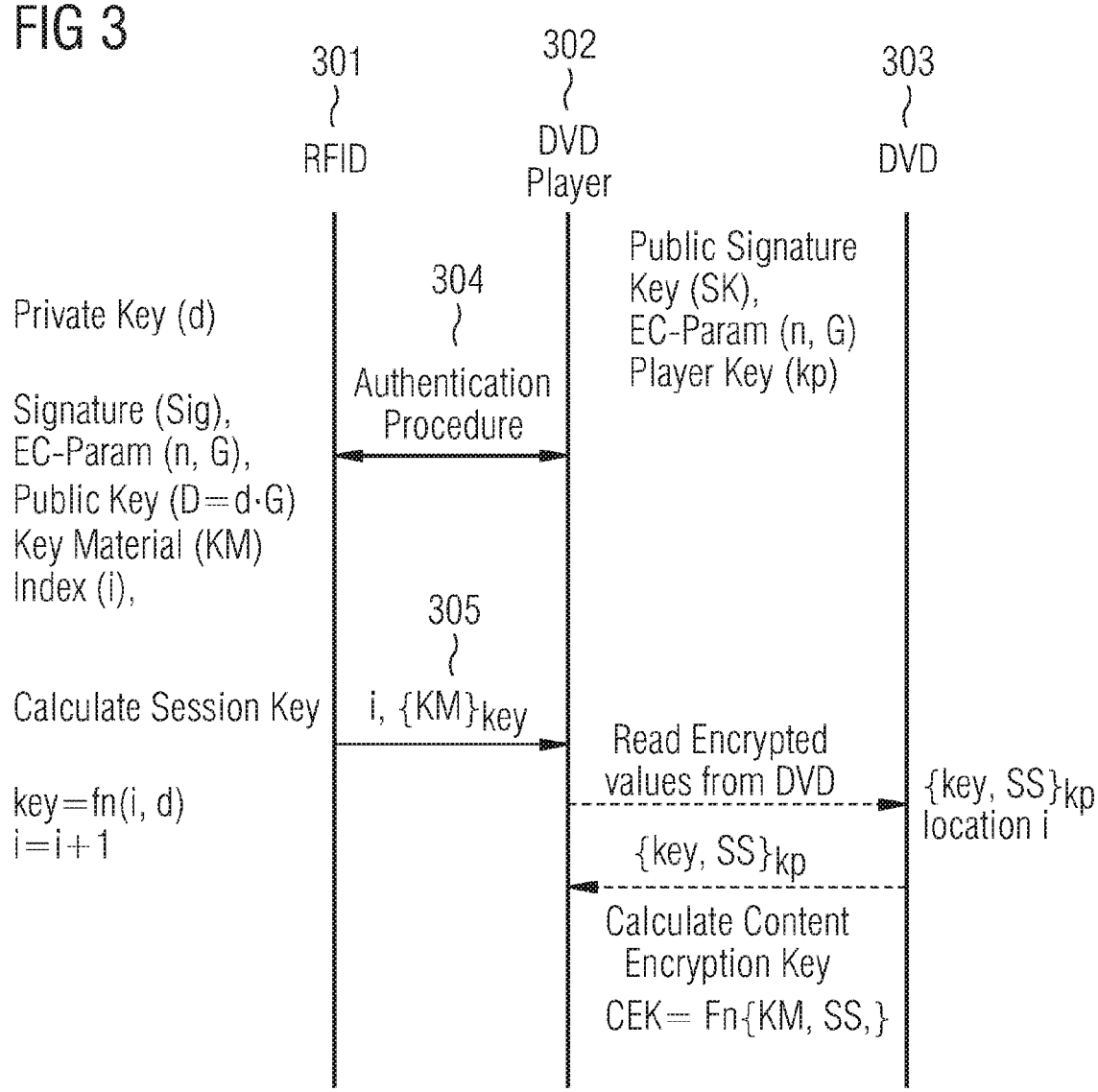

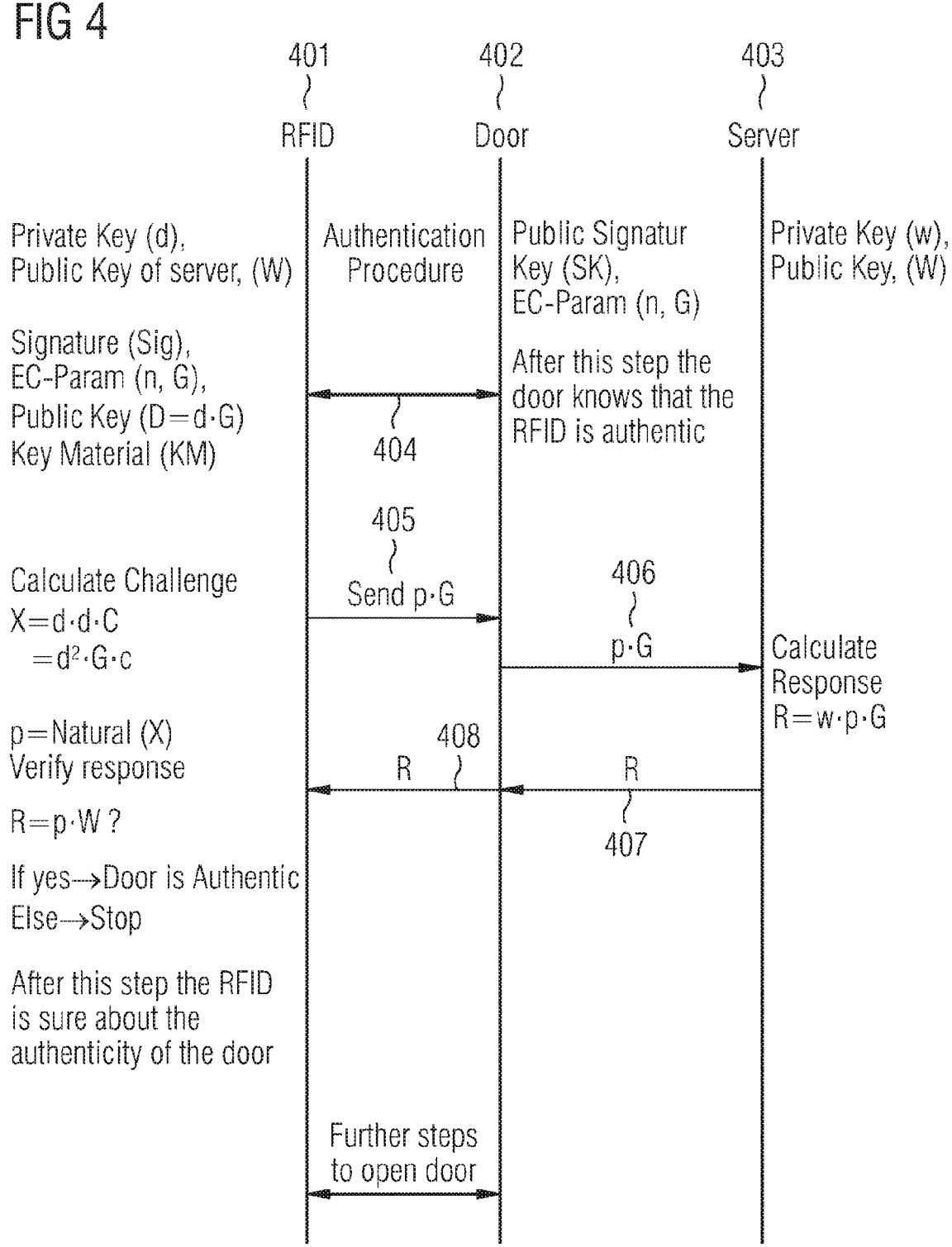

METHOD AND DEVICE FOR AGREEING SHARED KEY BETWEEN FIRST COMMUNICATION DEVICE AND SECOND COMMUNICATION DEVICE

CROSS REFERENCE TO RELATED APPLICATIONS

This application is based on and hereby claims priority to German Application No. 10 2006 004 237.9 filed on Jan. 30, 2006, the contents of which are hereby incorporated by reference.

BACKGROUND

Described below are a method and a device for agreeing a shared key between a first communication device and a second communication device.

A multiplicity of potential applications exist for storage media having small integrated computing capacities, such as, for example, USB memory sticks with built-in processors, RFID chips, smart chipcards, etc. They can be used, for example, for access control or in logistical processes. A further application area is digital rights management systems as used in the sales and marketing of DVDs and licensed software.

A precondition for the use of the communication devices in such security-critical applications is that secure handling of the sensitive data, in particular during the transmission to another communication device, is guaranteed.

Let this be explained in more detail with reference to an example. Access to copy-protected electronic data objects, such as, for example, audio files, video files or software, is usually controlled by electronic protection mechanisms called digital rights management (DRM) systems. They restrict access to digital offerings mostly to registered, i.e. paying, users, or even allow individual billing of single accesses to an offering. In practice this operates via specially developed file formats which include a copy protection or encryption. Consequently these files can only be used by special programs and an associated key called a content encryption key (CEK). This means that without the corresponding key CEK it is not possible to access the content of the protected data object.

The encrypted content of the data object that is to be protected is typically stored on a storage medium, such as CDs, DVDs, USB sticks or SD ("Secure Digital") memory cards, and the corresponding key CEK for decrypting the digital content is distributed separately. It is particularly advantageous to deliver the key CEK on a communication device with limited memory space and limited available computing capacity.

An example of a communication device of this type is an RFID ("Radio Frequency IDentification") chip, which may be a silicon chip with an integrated processor having limited computing capacities, an antenna for the purpose of communicating with a reader device, and a small memory space of about two kilobytes. These properties make RFID chips an attractive medium for distributing keys CEK by which access to encrypted contents on a storage medium is granted.

A problematic aspect with this type of solution is the transmission of the key CEK or the data for determining the key CEK to the communication device which is to decrypt the protected content. In this case it must be guaranteed that the key CEK will be transmitted only to appropriately authorized communication devices and that the communication devices in turn accept the key CEK only from appropriately authorized communication devices. This is ensured by a mutual authentication protocol between the receiving communication device and the transmitting communication device. For this purpose, however, known authentication protocols require extensive computing capacities and a large amount of available memory space.

SUMMARY

An aspect is therefore to provide a method and a device for mutual authentication of a first communication device and a second communication device as well as for agreeing a shared key between the first communication device and the second communication device, wherein a further reduction in the required computing capacity and a reduction in the required memory space is achieved compared to known solutions.

Accordingly, in a method for agreeing a shared key between a first communication device and a second communication device, security parameters are agreed between the two communication devices. On the basis of the agreed security parameters, a first security value is determined by the second communication device and transmitted to the first communication device. On the basis of the agreed security parameters and the transmitted first security value, a second and a third security value are determined by the first communication device and transmitted to the second communication device. The second communication device authenticates the first communication device if the transmitted second security value and a fourth security value determined by the second communication device on the basis of the agreed security parameters match. Assuming a successful authentication, the first communication device and the second communication device each determine a shared key on the basis of the agreed security parameters and the third security value. It is particularly advantageous in this scheme that the authentication protocol is designed in such a way that the communication device having limited integrated computing capacities is not required to check or verify signatures or certificates, and consequently a substantial reduction in the necessary computing overhead is achieved. Furthermore, no central server is required for authentication purposes, since all the values necessary for the authentication process can already be retrieved from a storage medium that in each case is accessible to the respective communication device.

According to a further embodiment, the agreed security parameters and the security values are transmitted wirelessly between the first and the second communication device, in particular by way of high-frequency electromagnetic signals in accordance with the RFID standard.

According to a further advantageous embodiment, a counter value is incremented in the first communication device after each agreement of a shared key and used for determining the third security value. In this way a shared key is agreed in an advantageous manner between the two communication devices with a minimum of computing overhead.

According to an advantageous development, a fifth security value is determined by the second communication device on the basis of the agreed security parameters and the transmitted second and/or third security value and transmitted to the first communication device. The first communication device authenticates the second communication device if the transmitted fifth security value and a sixth security value determined by the first communication device on the basis of the agreed security parameters match. This has the advantageous effect that the second communication device also is directly authenticated by the first communication device. This can be necessary in particularly security-critical applications.

Accordingly, a device for agreeing a shared key between a first communication device and a second communication device the device is configured in such a way that the following method can be performed: Security parameters are agreed between the first and the second communication device. On the basis of the agreed security parameters, a first security value is determined by the second communication device and transmitted to the first communication device. A second and a third security value are determined by the first communication device on the basis of the agreed security parameters and the transmitted first security value and transmitted to the second communication device. The second communication device authenticates the first communication device if the transmitted second security value and a fourth security value determined by the second communication device on the basis of the agreed security parameters match. In the event of a successful authentication the first communication device and the second communication device each determine a shared key on the basis of the agreed security parameters and the third security value.

BRIEF DESCRIPTION OF THE DRAWINGS

These and other aspects and advantages will become more apparent and more readily appreciated from the following description of exemplary embodiments, taken in conjunction with the accompanying drawings of which:

FIG. 1 is a data processing and transmission diagram providing a schematic representation of a method for authentication and agreement of a shared key between two communication devices, FIG. 2 is a data record diagram providing a schematic representation of a data bit vector with an assignment of the data bit vector with information relating to rights to a data object, FIG. 3 is a data processing and transmission diagram providing a schematic representation of a method for agreeing a shared key between two communication devices, FIG. 4 is a data processing and transmission diagram providing a schematic representation of a method for mutual authentication between two communication devices.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

FIG. 1 schematically illustrates a method for authenticating a first communication device to a second communication device and for agreeing a shared key between a first communication device and a second communication device. In this exemplary embodiment the first communication device is an RFID chip 101 and the second communication device a DVD player 102 which wishes to access the digital content stored on a DVD 103. For that purpose the DVD player 102 requires key material KM from the RFID chip 101 in order to generate the content encryption key CEK for decrypting the digital content on the DVD 103 as a function of secret string SS and key material KM. At the start of the method the two communication devices 101 and 102 agree security parameters. A private key d, a signature Sig, parameters on the elliptic curve n,G and a public key $D=d*G$ are known to the RFID chip 101, and a public signature key SK, parameters on the elliptic curve n,G and a player key kp are known to the DVD player 102.

First, at 104, the RFID chip 101 transmits the parameters on the elliptic curve n,G together with the public key D and the signature Sig to the DVD player 102. If the DVD player 102 has verified the signature of the RFID chip 101 on the basis of the parameters on the elliptic curve n,G and the public signature key SK, the DVD player 102 calculates a first security value $C=c*G$ where $c\epsilon_{RAND}[1,n]$ and the transmits 105 the first security value to the RFID chip 101. The latter calculates a second security value $R=d*C$ on the basis of the received first security value C and its private key d. In order to determine a third security value $p*G$, the RFID chip 101 first calculates an $X=d*R$ and then converts the determined value X into a natural number p. Lastly, the third security value $p*G$ is determined by the RFID chip 101. Finally, at 106 and 107, the second and the third security value are transmitted to the DVD player 102. If a fourth security value $c*D=c*d*G$ determined by the DVD player 102 is equal to the received second security value R, the DVD player 102 authenticates the RFID chip 101. Both communication devices 101 and 102 then calculate the shared session key $Key=p*c*G$. On the basis of the shared key Key the RFID chip 101 encrypts the key material KM and transmits 108 the encrypted key material to the DVD player 102. The DVD player 102 determines the corresponding secret string SS on the DVD 103 and calculates the content encryption key CEK on the basis of the decrypted key material KM and the secret string SS. With the aid of the CEK the DVD player 102 is now able to decrypt the encrypted digital content contained on the DVD 103.

Since the DVD player 102 can only determine the content encryption key CEK if it has received the secret string SS using an identical device key kp, the DVD player 102 is implicitly authenticated to the RFID chip 101 in this exemplary embodiment.

FIG. 2 shows by way of example a data bit vector which is stored on a communication device with limited computing capacity and a limited amount of available memory space. The vector indicates which rights a specific user possesses in respect of a specific data object. The data vector can indicate, for example, an existing right at a predefined position 201 in the data bit vector by a 1 and a non-existing right by a 0. A corresponding status function relating to the respective right is provided in this example in a predefinable adjacent data bit vector cell 202. In the example in FIG. 2 the data bit vector can be interpreted in the sense that the data object can be played 201 three times 202, copied 204 two times 203, and as of a certain date 205 copied only once 206.

FIG. 3 schematically illustrates a method for agreeing a shared key between a first communication device and a second communication device. In this exemplary embodiment the authentication procedure between the RFID chip 301 and the DVD player 302 takes place in the same way as in the exemplary embodiment described above with reference to FIG. 1. In this exemplary embodiment a counter value i is also provided which is stored in the RFID chip 301 and is incremented by the value 1 after each concluded agreement of a shared key. After the authentication of the RFID chip 301 to the DVD player 302 has been completed at 304, the shared key Key is determined by the RFID chip 301 as a function of the counter value i and the private key d. Next, at 305, the counter value i and the key material KM encrypted by the key Key are transmitted by the RFID chip 301 to the DVD player 302. After this, the counter value i is incremented by the value 1 by the RFID chip 301. With the aid of the received counter value i the DVD player 302 reconstructs the key Key and subsequently decrypts the encrypted key material KM. As already explained in the foregoing, the DVD player 302 is then able, on the basis of the decrypted key material KM and the secret string SS, to determine the content encryption key CEK for decrypting the digital content on the DVD 303.

FIG. 4 shows a method for authenticating a second communication device to a first communication device. In this exemplary embodiment, instead of a DVD, a server 403 is used to which a user would like to obtain access via a server door 402 with the aid of an RFID chip 401. The authentication of the RFID chip 401 to the server door 402 takes place as in the method described in FIG. 2. After the authentication has been completed, the RFID chip 401 determines 404 the third security value p*G and in transmits 405 the value to the server door 402, which in turn, transmits 406 the third security value to the server 403. The server 403 now transmits a fifth security value R=w*p*G and at 407 and 408 transmits the fifth security value via the server door 402 to the RFID chip 401. If the transmitted fifth security value matches a sixth security value p*W=p*w*G determined by the RFID chip 401, the RFID chip 401 authenticates the server door 402. After the mutual authentication has been concluded, the RFID chip 401 can transmit information that is required in order to obtain access to the server 403 via the server door 402.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to exemplary embodiments and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for agreeing upon a shared key between first communication and second communication devices, comprising:
    agreeing upon security parameters by the first and second communication devices;
    determining a first security value by the second communication device based on the security parameters previously agreed upon;
    transmitting the first security value from the second communication device to the first communication device;
    determining second and third security values by the first communication device based on the first security value and the security parameters previously agreed upon;
    transmitting the second and third security values from the first communication device to the second communication device;
    authenticating the first communication device by the second communication device, if the second security value matches a fourth security value determined by the second communication device based on the security parameters previously agreed upon;
    determining, by the first and second communication devices upon successful authentication of the first communication device, a shared key based on the third security value and the security parameters previously agreed upon.

2. The method as claimed in claim 1, wherein the security parameters previously agreed upon include parameters of an elliptic curve and parameters for an asymmetric cryptographic method.

3. The method as claimed in claim 1, wherein the security parameters previously agreed upon and the first, second and third security values are transmitted wirelessly between the first and the second communication devices.

4. The method as claimed in claim 1, wherein the security parameters previously agreed upon and the first, second and third security values are transmitted between the first and the second communication devices via high-frequency electromagnetic signals in accordance with an RFID standard.

5. The method as claimed in claim 1,
    further comprising incrementing a counter value in the first communication device after each agreement of the shared key,
    wherein said determining of the third security value is based on the counter value.

6. The method as claimed in claim 1, wherein
    a fifth security value is determined by the second communication device on the basis of the agreed security parameters and the transmitted second or third security value and transmitted to the first communication device,
    the first communication device authenticates the second communication device if the transmitted fifth security value and a sixth security value determined by the first communication device on the basis of the agreed security parameters match.

7. A first device that is communicably connectable to a second communication device, comprising:
    a computer processor that executes:
        receiving a first security value determined by the second communication device based on security parameters previously agreed upon by the first and second communication devices;
        determining second and third security values based on the received first security value and the security parameters previously agreed upon and transmitting the second and third security values to the second communication device, wherein a fourth security value is determinable by the second communication device based on the security parameters previously agreed upon for authenticating the first communication device when the second security value matches the fourth security value; and
        determining upon successful authentication of the first communication device by the second communication device, a shared key based on the third security value and the security parameters previously agreed upon.

* * * * *